July 19, 1949.   W. T. KISER   2,476,495
HEADLIGHT FOR MOTOR VEHICLES
Filed Oct. 31, 1945   2 Sheets-Sheet 1

W. T. Kiser
INVENTOR.

BY
ATTORNEYS.

July 19, 1949.   W. T. KISER   2,476,495
HEADLIGHT FOR MOTOR VEHICLES
Filed Oct. 31, 1945   2 Sheets-Sheet 2

W. T. Kiser
INVENTOR.

BY C. A. Snow & Co.
ATTORNEYS.

Patented July 19, 1949

2,476,495

UNITED STATES PATENT OFFICE 2,476,495

HEADLIGHT FOR MOTOR VEHICLES

Warren T. Kiser, Marion, Ind.

Application October 31, 1945, Serial No. 625,872

1 Claim. (Cl. 240—62.51)

This invention relates to headlights for motor vehicles, one of the objects being to provide a headlight structure which can be built into the fenders and which is so constructed that, when the vehicle is turned in one direction, one of the headlights will be turned in the same direction while the remaining headlight will continue to project the light rays forwardly.

Another object is to provide mechanism of this character which is simple and compact in construction and will operate smoothly and accurately at all times.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred form of the invention has been shown.

In said drawings

Figure 1:
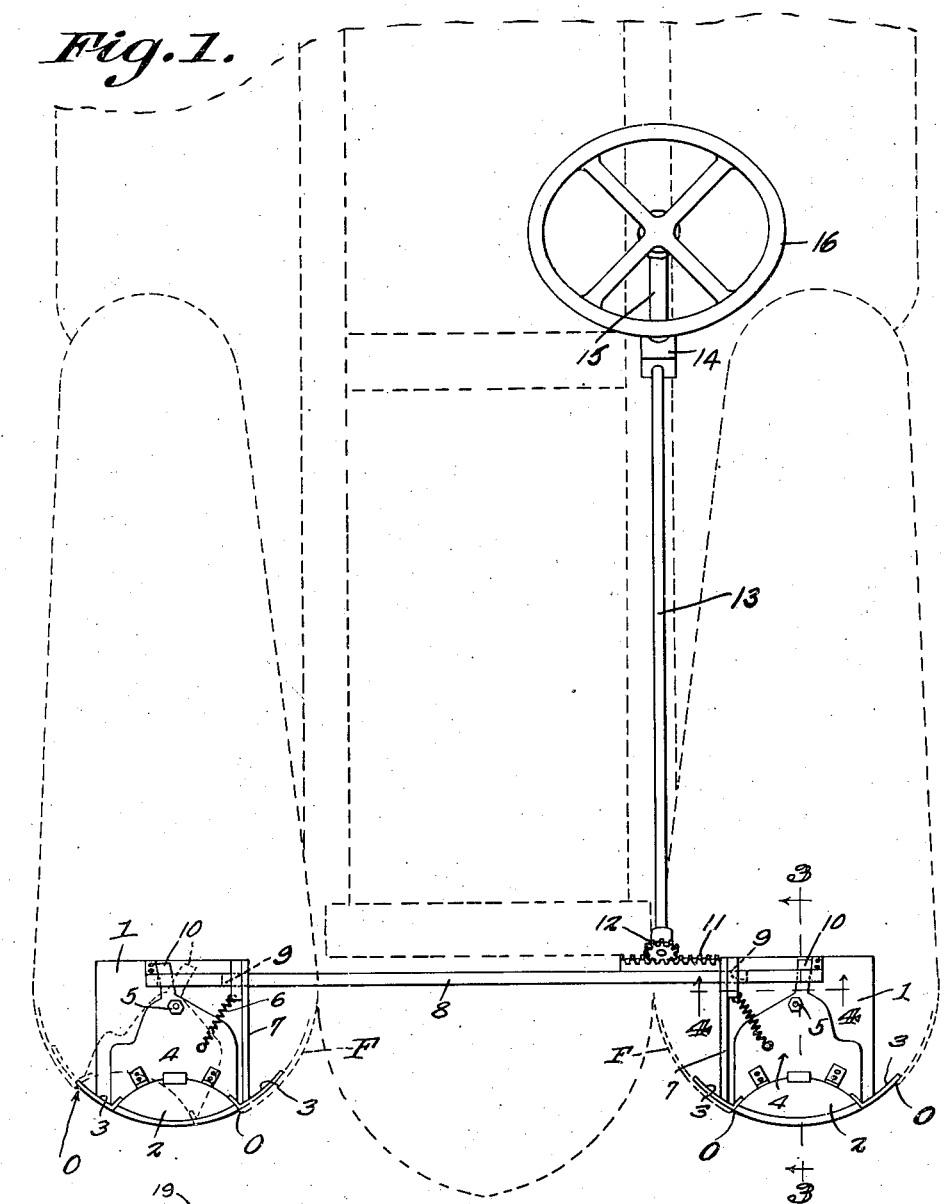
Figure 1 is a top plan view of the directional headlight mechanism constituting the present invention, a portion of the vehicle to which it is applied being indicated by broken lines.

Referring to the figures by characters of reference, 1 designates a pair of angle plates forming supporting brackets each of which is adapted to be secured in the front portion of one of the fenders F of the vehicle and back of an opening O in said fender. Each of these brackets carries the reflector or housing portion 2 of a headlight the front or lens portion of which is normally positioned across the opening O. Wings 3 extend from each housing 2 and cooperate with said housing to maintain the opening O closed no matter to what position the housing might be moved.

Brackets 1 are fixedly joined to the fenders and the housings 2 are fixedly secured to base plates 4 supported on the brackets 1 and joined thereto by pivot bolts 5 or the like. These bolts are located substantially at the centers of the arcs described by the rounded front portions of the fenders and springs 6 which are connected to the base plates 4 and to the brackets, serve to hold the lamp housings and their bases 4 normally pressed toward each other against the inner sides 7 of the brackets 1 so that light rays thus normally will be projected forwardly by the headlights.

Slidably mounted within the inner sides 7 of the angle brackets 1 is a connecting bar 8 provided in each end portion with a longitudinal slot 9 and into each of these slots is extended an arm 10 extending backwardly from the adjacent pivoted base 4. The two arms are held loosely within the outer end portions of the respective slots so that when the bar 8 is moved, for example, toward the right in Fig. 1, it will pull on the arm 10 at the left of said figure and cause the headlight to swing as indicated by broken lines. At the same time bar 8 will move away from the arm 10 at the right of Fig. 1 and will not actuate it. When the direction of movement of the bar is reversed the foregoing operation of the two bases and their lamp housings will be reversed.

For the purpose of actuating bar 8 there is provided a rack 11 which is secured to and extends lengthwise of the bar and is constantly in mesh with a gear 12 secured to one end of an intermediate shaft 13. This intermediate shaft extends backwardly and is journaled in a bracket 14 through which the shaft 15 of the steering wheel 16 is extended and gears 17 and 18 on the two shafts 15 and 13 are in constant mesh.

From the foregoing it will be noted that when the vehicle is steered by means of the wheel 16 motion will be transmitted to the rack 11 with the result that one or the other of the pivoted bases 4 will be shifted from normal position so as to cause the lamp housing carried thereby to swing in the direction in which the vehicle is turned. At the same time the other lamp housing will be held against movement so that its light rays will be projected straight forwardly.

By providing a directional headlight mechanism such as described the driver can see not only straight ahead but also in the direction in which a turn is being made and accidents which otherwise might occur can thus be avoided.

Figure 5:
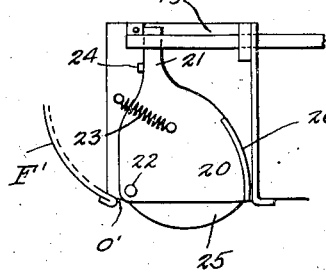
Figure 5 is a view partly in plan and partly in section showing a modified structure adaptable to fenders of any shape.
Figure 2:
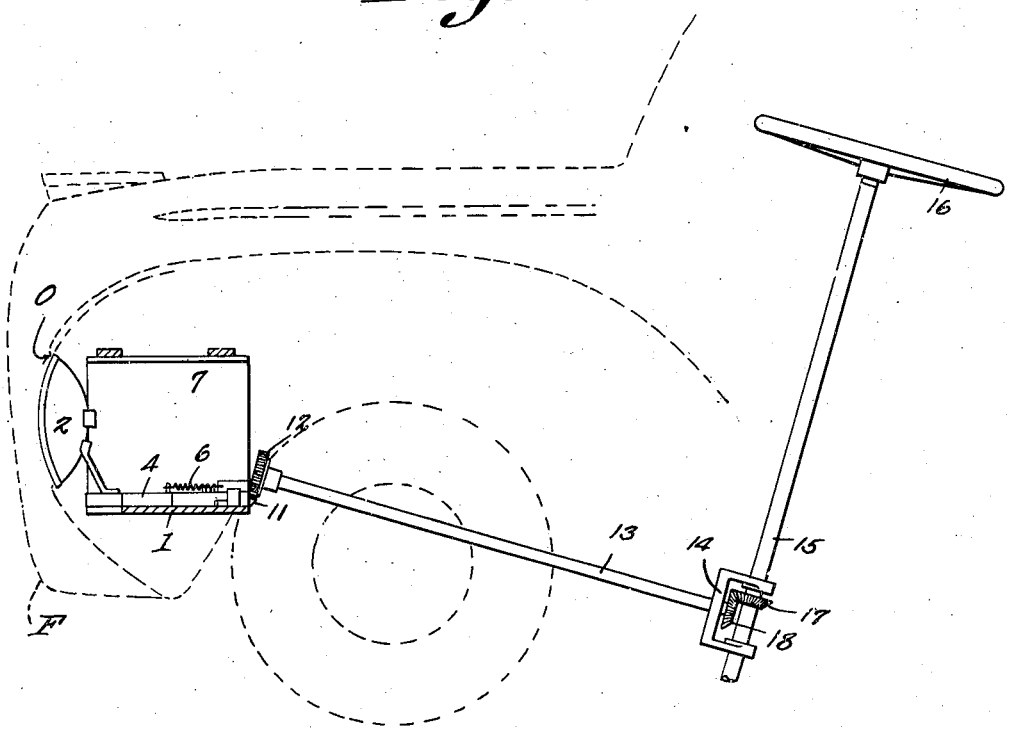
Figure 2 is a view partly in side elevation and partly in section of the headlight structure.
Figure 3:
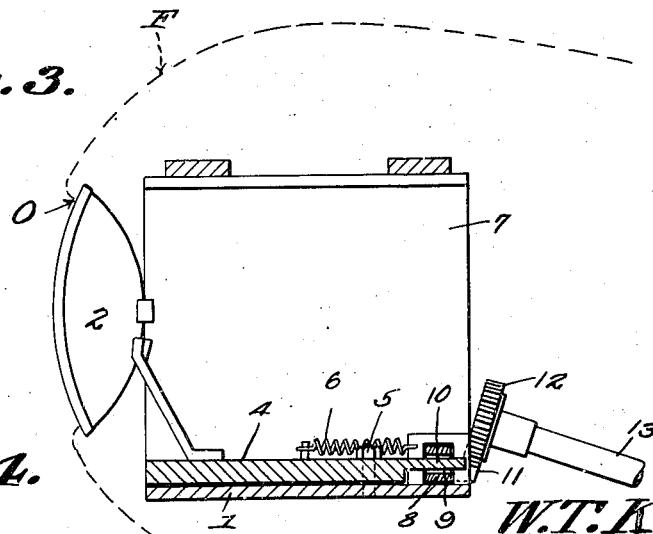
Figure 3 is an enlarged section on line 3—3, Fig. 1.
Figure 4:
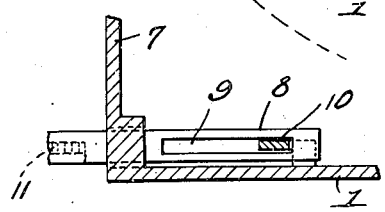
Figure 4 is an enlarged section on line 4—4, Fig. 1.

In order to adapt this invention to fenders of any shape, the structure illustrated in Fig. 5 has been developed. In this modified structure the fender F' has an opening O' below and back of which is located a fixed bracket 19 corresponding with the bracket 1. On this bracket there is mounted a base plate 20 having a backwardly extending arm 21. This base plate is pivotally connected to the bracket 19 close to the outer side of the opening O' and indicated at 22, and a spring 23 serves to hold the arm 21 normally pressed against a stop 24. When the arm and bracket are in this normal position the lamp housing indicated generally at 25 and which is carried by the forward end of the plate 20, is positioned within the opening O' which can be circular. Obviously when the bracket 20 is actuated by the means heretofore described, it will cause the lamp housing 25 to swing forwardly and laterally within the opening O'.

This modified structure obviates the necessity of using a fender of special shape. Instead any fender can be formed with a circular opening in its forward end of off size to receive the lamp housing and the dirigible headlight can then be placed in position.

For the purpose of maintaining the opening O' closed while the lamp is out of normal position, an arcuate shield 26 concentric with the pivot 22 can be carried by the bracket 20. This shield is so located that it will be positioned close to the inner side of opening O' at all times when the bracket is out of normal position.

What is claimed is:

Directional headlight apparatus for motor vehicles, comprising supporting brackets respectively mounted within the front fenders of the vehicle, the fenders having head lamp-receiving openings, base plates pivotally mounted on the brackets, head lamps fixedly mounted on the base plates in position to project light rays through the openings of the fenders, yielding means extending between the base plates and brackets, whereby to return the base plates to normal position when moved therefrom, the head lamps, when the base plates are in normal position, projecting light rays straight forwardly, shields carried by the head lamps and cooperating therewith to maintain the fender openings closed when the head lamps are moved from normal position, a connecting bar extended between the brackets, the ends of said bar being slidably mounted in the brackets, there being longitudinal slots in said ends, arms rearwardly extended from the base plates, the arms being loosely received in the slots, and means, comprising a geared connection, extending between the connecting bar and the steering shaft of the vehicle, whereby to transmit reciprocating motion to the bar from the steering shaft.

WARREN T. KISER.

REFERENCES CITED

The following references are of record in the file of this patent:

UNITED STATES PATENTS

| Number | Name | Date |
|---|---|---|
| 1,186,914 | Krumbein | June 13, 1916 |
| 1,422,388 | Sumbulian | July 11, 1922 |
| 1,425,759 | Flood | Aug. 15, 1922 |
| 1,683,802 | Rath | Sept. 11, 1928 |
| 1,733,289 | Wilson | Oct. 29, 1929 |
| 1,750,077 | Welch | Mar. 11, 1930 |
| 2,128,765 | Wing | Aug. 30, 1938 |
| 2,434,766 | Herrington | Jan. 20, 1948 |

FOREIGN PATENTS

| Number | Country | Date |
|---|---|---|
| 29,869 | France | Aug. 11, 1925 |
| | (Addition to No. 579,340) | |